US012741442B2

(12) United States Patent
Hoff et al.

(10) Patent No.: US 12,741,442 B2
(45) Date of Patent: Sep. 22, 2026

(54) EXPANDABLE AND/OR DISPOSABLE ICE PACK

(71) Applicant: Board of Trustees of Western Michigan University, Kalamazoo, MI (US)

(72) Inventors: Mark Hoff, Oriental, NC (US); Charles F. Schroer, Raleigh, NC (US); Paul Kenyon, Canton, OH (US); Murray Ross, Espanola (CA); Brian Spain, Marysville, MI (US)

(*) Notice: Subject to any disclaimer, the term of this patent is extended or adjusted under 35 U.S.C. 154(b) by 176 days.

(21) Appl. No.: 18/800,692

(22) Filed: Aug. 12, 2024

(65) Prior Publication Data

US 2025/0050615 A1 Feb. 13, 2025

Related U.S. Application Data

(63) Continuation of application No. 16/973,665, filed as application No. PCT/US2019/037926 on Jun. 19, 2019, now Pat. No. 12,059,877.

(Continued)

(51) Int. Cl.
*B32B 3/20* (2006.01)
*B32B 3/04* (2006.01)

(Continued)

(52) U.S. Cl.
CPC .................. *B32B 3/20* (2013.01); *B32B 3/04* (2013.01); *B32B 5/022* (2013.01); *B32B 5/26* (2013.01); *B32B 27/10* (2013.01); *B32B 27/12* (2013.01); *B32B 29/005* (2013.01); *B32B 29/02* (2013.01); *F25D 3/08* (2013.01); *B32B 2307/54* (2013.01);

(Continued)

(58) Field of Classification Search
CPC .. B32B 3/20; B32B 3/04; B32B 5/022; B32B 5/26; B32B 27/10; B32B 27/12; B32B 29/005; B32B 29/02; B32B 2307/54; B32B 2307/718; B32B 2307/7265; B32B 2307/73; B32B 2439/00; B32B 7/06; B32B 2250/05; B32B 2307/728; B32B 3/08; B32B 2307/726; B32B 2307/748;

(Continued)

(56) References Cited

U.S. PATENT DOCUMENTS

2017/0312148 A1* 11/2017 Dobrosielska-Oura ...................... A61F 13/539
2018/0148246 A1* 5/2018 Fu ........................... B32B 29/02

FOREIGN PATENT DOCUMENTS

CA 2782520 A1 * 7/2011 ........... A61L 31/129
CN 105691943 A * 6/2016

(Continued)

*Primary Examiner* — Emmanuel E Duke
(74) *Attorney, Agent, or Firm* — David J. Johnson

(57) ABSTRACT

This disclosure includes ice packs that include paper and absorbent material, and also includes various methods of adding liquid to, freezing, shipping, and/or using such ice packs. Some of the ice packs of this disclosure have a body that includes first and second layers of paper and one or more side panels coupled thereto such that the body is expandable. The absorbent material of some of the ice packs of this disclosure includes a laminate having an inner layer of superabsorbent polymer disposed between first and second outer layers, where the first outer layer includes tissue and the second outer layer includes at least one of a tissue and a carded nonwoven.

21 Claims, 8 Drawing Sheets

Related U.S. Application Data

(60) Provisional application No. 62/687,049, filed on Jun. 19, 2018.

(51) Int. Cl.

| | |
|---|---|
| ***B32B 5/02*** | (2006.01) |
| ***B32B 5/26*** | (2006.01) |
| ***B32B 27/10*** | (2006.01) |
| ***B32B 27/12*** | (2006.01) |
| ***B32B 29/00*** | (2006.01) |
| ***B32B 29/02*** | (2006.01) |
| ***F25D 3/08*** | (2006.01) |

(52) U.S. Cl.

CPC . *B32B 2307/718* (2013.01); *B32B 2307/7265* (2013.01); *B32B 2307/73* (2013.01); *B32B 2439/00* (2013.01); *F25D 2303/08222* (2013.01)

(58) Field of Classification Search

CPC ... B32B 7/12; F25D 3/08; F25D 2303/08222; F25D 2303/0822; Y02A 40/81; A01K 61/13

See application file for complete search history.

(56) References Cited

FOREIGN PATENT DOCUMENTS

| | | | | | |
|---|---|---|---|---|---|
| JP | 2018000645 A | * | 1/2018 | | |
| KR | 101822577 B1 | * | 3/2018 | ............. | B65D 81/18 |
| WO | WO-9307965 A1 | * | 4/1993 | ........... | A01K 1/0152 |

* cited by examiner

EXPANDABLE AND/OR DISPOSABLE ICE PACK

CROSS REFERENCE TO RELATED APPLICATIONS

This application in a continuation of U.S. application Ser. No. 16/973,665, filed Dec. 9, 2020, which is a national phase application under 35 U.S.C. § 371 of International Application No. PCT/US2019/037926, filed Jun. 19, 2019, which claims priority to and the benefit of U.S. Provisional Application No. 62/687,049, filed Jun. 19, 2018, the contents of which applications are incorporated into the present application by reference.

FIELD OF INVENTION

The present invention relates generally to ice packs, such as may be used to keep cold perishable items; and more particularly, but not by way of limitation, ice packs that comprise paper and absorbent material, and various assemblies and methods related to such ice packs.

BACKGROUND

Ice packs—which may also be referred to in the art as freezer ice packs, cold packers, freezer packs, and/or the like—are often used to keep perishable and/or temperature-sensitive items like food cold during shipping and/or storage. Such prior art ice packs typically include a plastic container, such as a bag or bottle, containing liquid or gel that can be frozen. Because such prior art ice packs typically include plastic and/or freezable gels with chemicals, they may not be environmentally friendly and/or may be relatively expensive.

SUMMARY

This disclosure includes embodiments of: ice packs comprising paper; methods of adding water or other liquid to ice packs, freezing ice packs, shipping ice packs, and/or otherwise using ice packs. The use of paper in the present ice packs can make them more environmentally friendly than prior art plastic ice packs. Some of the present ice packs are recyclable, i.e., made from and/or with recyclable materials. Additionally, the present ice packs can be manufactured to have an opening through which liquid can be introduced as a thermal medium into the ice pack, thereby reducing initial weight and shipping costs to a point of use by allowing the liquid to be added at the point of use. The present ice packas can include one or more side panels, the use of which can make the ice packs expandable, thereby permitting relatively greater amounts of liquid to be introduced therein.

Some of the present ice packs have a body that comprises paper. In some ice packs, the paper is configured to resist degradation when exposed to water. In some ice packs, the body defines an interior chamber and an opening in communication with the interior chamber and can be configured to receive liquid into the interior chamber. In some of such ice packs, the opening is configured to be closed after the liquid is received therein. In some ice packs, the opening is defined by and through one of the first and second layers of paper.

In some ice packs, the body comprises a first layer of paper having a first perimeter and a second layer of paper having a second perimeter. In some ice packs, the body has one or more side panels, optionally two or more side panels, where each side panel of the one or more side panels is coupled to the first and second layers of paper. In some ice packs, each side panel of the one or more side panels is bonded to a first portion of each of the first and second perimeters. In some ice packs, the first layer of paper is bonded to the second layer of paper along a second portion of each of the first and second perimeters. In some ice packs, the opening is defined by a third portion of each the first and second perimeters. In some ice packs, for each of the first and second perimeters, the first portion and the second portion comprise a majority of the perimeter.

In some ice packs, each side panel of the one or more side panels are coupled to the first and second layers of paper such that the body is expandable from a collapsed state to an expanded state. In some ice packs, each side panel of the one or more side panels is foldable such that, when the body is in the collapsed state, at least a portion of the side panel extends farther inwardly towards a center of the body than when the body is in the expanded state. In some ice packs, when the body is in the expanded state, at least a portion of the first perimeter and at least a portion of the second perimeter are disposed farther apart than when the body is in the collapsed state. In some ice packs, when the body is in the expanded state, each side panel of the one or more side panels extends from the first layer of paper to the second layer of paper. In some ice packs, when the body is in the expanded state, the volume of the interior chamber is larger than when the body is in the collapsed state.

Some ice packs have an absorbent material. In some ice packs, the absorbent material is disposed in the interior chamber such that, when liquid is received into the interior chamber from the opening, the absorbent material absorbs at least some of the liquid. In some of such ice packs, the absorbent material comprises a laminate, and the laminate may absorb at least some of the liquid received into the interior chamber. In some ice packs, the laminate has an inner layer disposed between first and second outer layers. In some ice packs, the inner layer comprises superabsorbent polymer (SAP).

In some ice packs an absorbent core is disposed in the interior chamber, and the absorbent core includes the absorbent material and a second absorbent material. The second absorbent material is different from the absorbent material. In some such ice packs, the absorbent core further includes a third absorbent material. The first and third absorbent material may include SAP, and the second absorbent material may not include SAP. In particular ice packs, the absorbent core is a laminate.

In some ice packs, the SAP has a centrifuge retention capacity between 30 and 50 grams per gram (g/g), optionally between 32 and 37 g/g, or optionally between 44 and 48 g/g. In some ice packs, the first outer layer comprises tissue. In some ice packs, the second outer layer comprises at least one of a tissue and a carded nonwoven.

The term "Centrifuge Retention Capacity (CRC)" as used herein refers to the ability of a material (e.g., SAP) to retain liquid therein after being saturated and subjected to centrifugation under controlled conditions and is stated as grams of liquid retained per gram weight of the sample (g/g). As used herein, CRC is the amount of 0.9 weight percent (wt %) saline solution (e.g., sodium chloride in water) that a SAP can retain under free swelling conditions when surface water has been removed in a centrifuge at room temperature and humidity. Although CRC values are determined with a saline solution, the ice packs can be used with other fluids, such as water (e.g., tap, distilled, etc.).

Some ice packs are substantially dry. Other ice packs have liquid disposed in the absorbent material. In some of such ice packs, the liquid disposed in the absorbent material is frozen.

Some embodiments of the present assemblies comprise a container and a plurality of the present ice packs disposed in the container. In some such assemblies, the ice packs are substantially dry. In other assemblies, liquid is disposed in the absorbent material of each of the ice packs and, if the liquid in the ice packs is frozen, the assembly may further comprise one or more perishable or otherwise temperature-sensitive items disposed in the container.

The term "coupled" is defined as connected, although not necessarily directly, and not necessarily mechanically: two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, 5, and 10 percent.

The terms "comprise" and any form thereof such as "comprises" and "comprising," "have" and any form thereof such as "has" and "having," and "include" and any form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

Any embodiment of any of the apparatuses, systems, and methods can consist of or consist essentially of—rather than comprise/include/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Further, a device or system that is configured in a certain way is configured in at least that way, but it can also be configured in other ways than those specifically described.

The feature or features of one embodiment may be applied to other embodiments, even though not described or illustrated, unless expressly prohibited by this disclosure or the nature of the embodiments.

Some details associated with the embodiments described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. Views in the figures are drawn to scale, unless otherwise noted, meaning the sizes of the depicted elements are accurate relative to each other for at least the embodiment in the view.

DETAILED DESCRIPTION OF ILLUSTRATIVE EMBODIMENTS

Figures 1A, 1B:
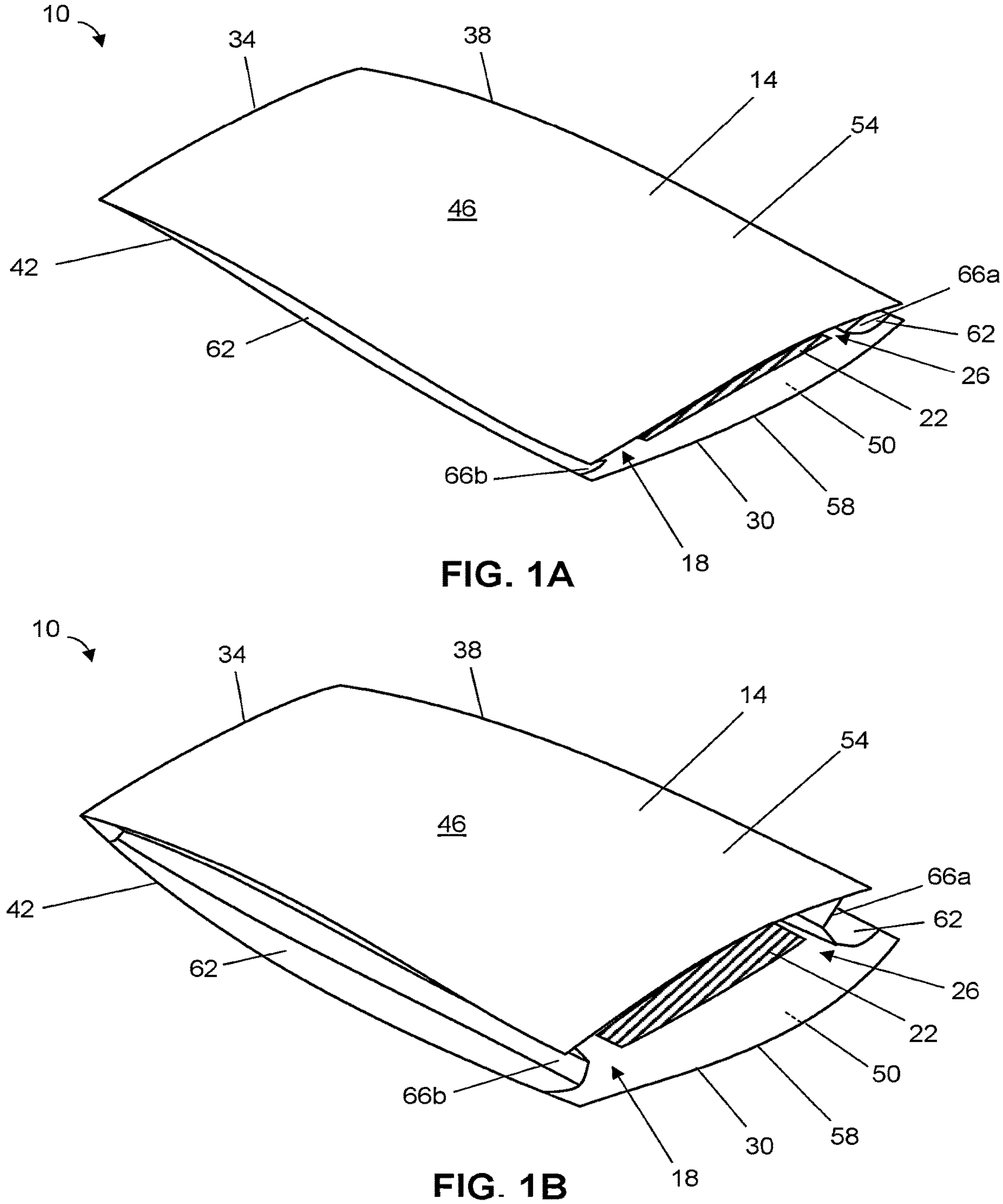
FIG. 1A is an upper perspective view of an embodiment of the present ice packs in a collapsed state.
FIG. 1B is an upper perspective view the ice pack of FIG. 1A in a partially expanded state.
Figure 1C:
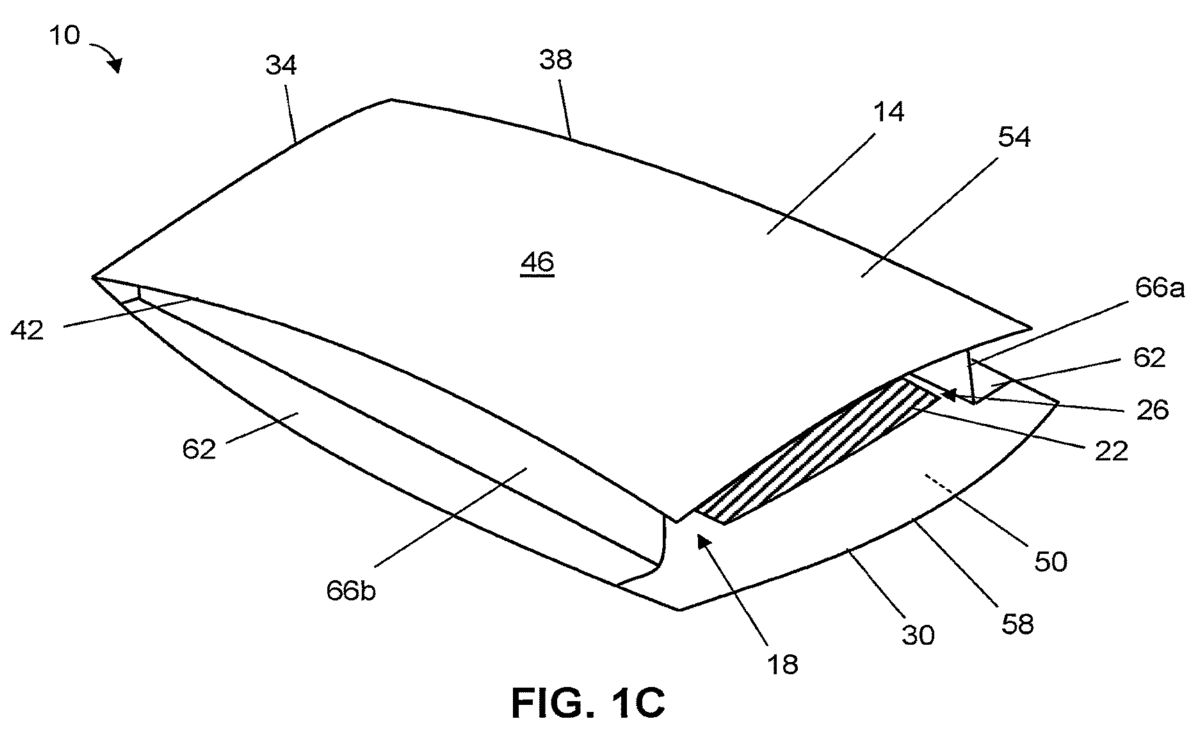
FIG. 1C is an upper perspective view of the ice pack of FIG. 1A in an expanded state and in an open state in which liquid can be added to its interior before being closed.
Figure 1D:
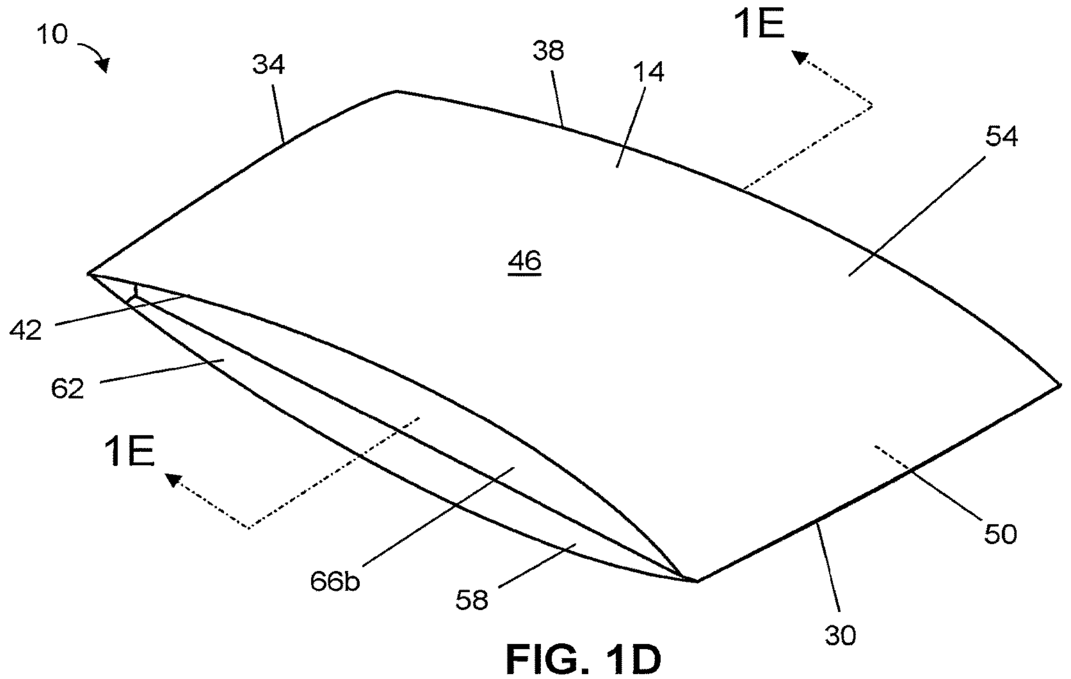
FIG. 1D is an upper perspective view of the ice pack of FIG. 1A in a closed state.

Referring now to the drawings, and more particularly to FIGS. 1A-1E, shown is an embodiment 10 of the present apparatuses or ice packs. In the embodiment shown, ice pack 10 includes a body 14 comprising paper that defines an interior chamber 18, and an absorbent material 22 disposed in the chamber. Body 14, when in an open state (FIGS. 1A-1C), defines an opening 26 in communication with interior chamber 18 that is configured to receive liquid into the interior chamber such that the liquid can be absorbed by and into the absorbent material. Opening 26 is further configured to be closed (FIG. 1D) after the liquid is received in interior chamber 18.

In the embodiment shown in FIGS. 1A-1E, body 14 has a top end 30, a bottom end 34, a left side 38, a right side 42, a front side 46, and a back side 50. "Top," "bottom," "left," "right," "front," and "back" are used for reference in the depicted orientations and do not suggest any required orientation of the present ice packs. In this embodiment, body 14 comprises a first layer 54 of paper having a first perimeter; and a second layer 58 of paper having a second perimeter. Body 14 can further comprise one or more side panels (e.g., *66a*, *66b*), each coupled to first layer 54 and second layer 58 such that the side panel extends therebetween; as shown, the body has two side panels *66a* and *66b*. First layer 54, second layer 58, and side panels *66a* and *66b* can together define interior chamber 18.

Side panels *66a* and *66b* at least in part enable body 14 to expand from a collapsed state (FIG. 1A) to an expanded state (FIG. 1C) to increase the volume of interior chamber 18. When body 14 is in the collapsed state and/or a partially expanded state, each of side panels *66a* and *66b* can be folded such that, for example, a portion of the side panel extends inwardly toward a center of the body (such as a "V"

fold or "Z" fold or variation thereof. More folds can be added to increase expansion volume, as discussed below). As body 14 expands (FIGS. 1B and 1C), side panels 66*a* and 66*b* extend and at least partially unfold such that, when the body is in the expanded state, the first and second perimeters are disposed farther apart than when the body is in the collapsed state. Side panels 66*a* and 66*b* at least partially define interior chamber 18 and thus, when so extended, increase the volume thereof. The expandability of body 14 may permit relatively more absorbent material 22 to be disposed within interior chamber 18 and/or relatively more liquid to be received therein, which may improve the cooling capacity of ice pack 10.

Each of side panels 66*a* and 66*b* can be bonded to first layer 54 and second layer 58 along a portion of each of the first and second perimeters, as indicated by region 62. As shown, side panels 66*a* and 66*b* are bonded to first and second layers 54 and 58 along left side 38 and right side 42, respectively. Each of side panels 66*a* and 66*b* may be bonded to first layer 54 and second layer 58, for example, by adhesive, heat, and/or pressure. As another example, for each of side panels 66*a* and 66*b*, first layer 54 and second layer 58 may be folded inward one or more times over a portion of the side panel that is disposed within region 62, and the layers stapled to retain the side panel. Additionally, first layer 54 can be bonded to second layer 58 along another portion of each of the first and second perimeters, for example along bottom end 34, using any of the above-described techniques. In other embodiments, first layer 54, second layer 58, and/or side panels 66*a* and 66*b* can be unitary and part of the bonded portions of the first and second perimeters. For example, first layer 54 can be unitary with second layer 58 and bottom end 34 can be defined by a fold. The bonded portions of each of the first and second perimeters can comprise a majority of the perimeter.

While ice pack 10 comprises two side panels 66*a* and 66*b*, other embodiments of the present ice packs can have any suitable number of side panels, such as, for example, greater than or equal to, or between any two of: 1, 2, 3, 4, 5, 6, 7, or more side panels. By way of illustration, some of the present ice packs can be substantially similar to ice pack 10, with one primary difference; namely, that the body has a third side panel bonded to the first and second layers (e.g., 54 and 58) along the bottom end (e.g., 34) of the body. In some of such embodiments, the first layer need not be bonded to the second layer. In other embodiments, the body can have no side panels, and the first layer can be bonded to the second layer along a majority of each of the first and second perimeters.

As noted above, body 14 and, specifically, each of layers 54, 58 comprises paper. Paper is typically not considered suitable for holding liquids such as water. The present embodiments, however, can utilize paper that is configured to resist degradation when exposed to water. For example, the paper can be treated to increase—e.g., include sizing that increases-hydrophobic properties of the paper. Such increased hydrophobic properties may, for example, increase the amount of time needed for water to saturate and thereby weaken the paper.

Additionally or alternatively, the paper can be configured to have a relatively high wet tensile strength, such as, for example, a wet tensile strength measured according to Test Standard ASTM D829-97—that is 20%, 30%, or more of the paper's dry tensile strength measured according to Test Standard ASTM D828-16. Wet tensile strength can be increased, for example, by increasing hydrophobic properties, as noted above, increasing the weight of the paper, and/or by the use of additives that provide fiber bond integrity in the presence of water. Some of the present embodiments can include paper having basis weight greater than any one, or between any two, of: 20, 30, 40, 50, 60, 70, 80, 90, 100, 110, 120, 130, 140, 150, or more grams per square meter (gsm).

Additionally or alternatively, the paper can be configured to resist passage of water through the paper. For example, the paper can be configured-via selection of fiber size, fiber type, fiber mixture, thickness, manufacturing process, and/or the like, as known in the paper-making art—to have porosity and/or pore sizes that are small enough to resist the passage of water through the paper. By way of further example, additionally or alternatively, the paper can be treated to increase—e.g., include sizing that increases-resistance to the passage of water through the paper, such as by further decreasing porosity and/or pore size, and/or by increasing hydrophobic properties of the paper. In some embodiments, the paper is liquid impermeable for at least a period of time, such as a period of time that is sufficient to freeze a volume of water with which a given ice pack is configured to be filled. "Liquid impermeable," when used in describing a layer of paper or a laminate of multiple layers of paper, or a laminate including paper, means that a liquid, such as water, will not pass through the layer or laminate, under ordinary use conditions, in a direction generally perpendicular to the plane of the layer or laminate at the point of liquid contact. By way of example, the paper may be configured to be liquid impermeable for a period greater than any one, or between any two, of: 5, 10, 20, 30, 60, 120, 180,240, 300, or more minutes.

Figure 1E:
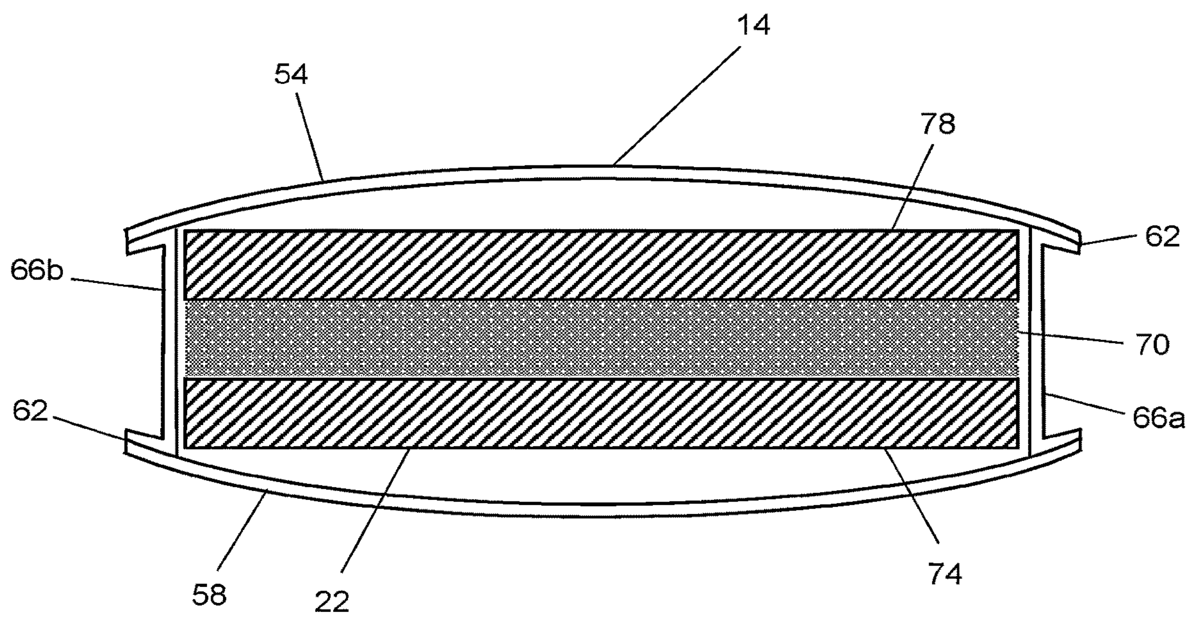
FIG. 1E is a cross-sectional view of the ice pack of FIG. 1A in an expanded state taken along line 1E-1E of FIG. 1D.

The inclusion of absorbent material 22 reduces the need for the paper of body 14 to be entirely liquid impermeable because the absorbent material absorbs liquid inserted into interior chamber 18 and thereby reduces the outward fluid pressure that might otherwise be exerted on the paper and, in turn, reduces or prevents leakage of undesirable or even perceptible amounts of liquid through the paper. Referring to FIG. 1E, absorbent material 22 can be a laminate that comprises an inner layer 70 disposed between first outer layer 74 and second outer layer 78. Inner layer 70 can comprise super absorbent polymer (SAP), first outer layer 74 can comprise tissue, and second outer layer 78 can comprise at least one of a tissue and a carded nonwoven. The laminate can form a structure that is similar in some respects, and can be manufactured by known methods used for, absorbent cores used in disposable diapers, incontinence pads, and other disposable absorbent articles. By way of illustration, absorbent material 22 can be formed by laying a mixture of SAP and adhesive—which becomes inner layer 70—on first outer layer 74, and thereafter layering second outer layer 78 on top of the SAP-adhesive mixture.

While absorbent material 22, as shown, has one inner layer 70 comprising SAP (hereinafter, "SAP layer") disposed between a first outer layer 74 comprising tissue and a second outer layer 78 comprising at least one of a tissue and a carded nonwoven (hereinafter, "substrate layers"), in other embodiments the absorbent material can have any suitable number of SAP layers and substrate layers. Absorbent material 22 can comprise, for example, 1, 2, 3, 4, 5, 6, 7, 8, or more SAP layers (e.g., 70) and 1, 2, 3, 4, 5, 6, 7, 8, or more substrate layers (e.g., 74 and/or 78). SAP layers and substrate layers can be layered in any suitable fashion. By way of illustration, and without limitation, absorbent material 22 can comprise three inner layers, including two SAP layers and an inner substrate layer, disposed between first and second outer substrate layers; in some of such embodiments, the inner substrate layer can be disposed between the SAP layers. In some embodiments in which there are multiple substrate layers, at least one of the substrate layers can be layered adjacent to another one of the substrate layers. Likewise, in some embodiments in which there are multiple SAP layers, at least one of the SAP layers can be layered adjacent to another one of the SAP layers. And while absorbent material 22, as shown, comprises a single laminate, in other embodiments absorbent material 22 can comprise more than one laminate, such as, for example, 2, 3, 4, 5, 6, 7, 8, or more laminates, each of which can comprise any of the laminates described above.

"Superabsorbent" or "superabsorbent material" or "SAP" refers to a water-swellable, water-insoluble organic or inorganic material capable, under the most favorable conditions, of absorbing at least about 15 times its weight in an aqueous solution containing 0.9 weight percent sodium chloride and, more desirably, at least about 30 times its weight in an aqueous solution containing 0.9 weight percent sodium chloride and, even more desirably, at least about 50 times its weight in an aqueous solution containing 0.9 weight percent sodium chloride. The SAP materials can be natural, synthetic and modified natural polymers and materials. In addition, the SAP materials can be inorganic materials, such as silica gels, or organic compounds such as cross linked polymers.

SAPs that are suitable for at least some embodiments of the present ice packs are available from Sumitomo Seika Europe S.A./N.V. in Belgium and/or from NA Industries, Inc. in Houston, Texas, USA. For example, in some embodiments, the SAP can have a centrifuge retention capacity of 20-60 grams per gram (g/g), for example 30-50 g/g, and/or a particle size distribution (PSD) with most or substantially all particles having a size between 150 μm and 850 μm. In some embodiments, the SAP can have a centrifuge retention capacity between 32 and 37 g/g, or alternatively between 44 and 48 g/g. As an illustrative, non-limiting example, the SAP includes or corresponds to NovaZorb, a registered trademark of EAM Corporation, such as NovaZorb C1832976. Ice packs with higher CRC values have increased capacity and cooling potential. Conversely, ice packs with lower CRC values have other benefits, such as potentially lower costs, thinner, lighter, etc. Accordingly, CRC values may be selected for a particular application or to achieve a particular design goal.

Not to be bound by any particular theory, a laminate comprising an inner layer of SAP and outer layers comprising tissue and/or a carded nonwoven may better absorb and/or retain liquids received in interior chamber 18 than other absorbent materials. Such improved liquid absorption and/or retention may enable interior chamber 18 to receive relatively larger volumes of liquid—as permitted by the expandability of body 14—without material degradation of the paper.

In use of the embodiment shown in FIGS. 1A-1E, liquid is introduced into interior chamber 18 and at least some, and in some instances substantially all, of the liquid is absorbed by absorbent material 22. Body 14 can be collapsed, partially expanded, or fully expanded prior to introduction of the liquid, and liquid can be introduced until the body is partially or fully expanded. The temperature of the ice pack can then be lowered, for example in a freezer, to freeze the liquid. Prior to or after freezing the liquid, opening 26 can be closed to fully enclose absorbent material 22 and the liquid in interior chamber 18. For example, top end 30 of layers 54, 58 can be folded over one or more times toward, and taped, stapled, or otherwise fixed relative to, front side 46 or back side 50 of body 14. In other embodiments, layers 54 and 58 can be taped or glued together at top end 30 without folding.

Figure 2:
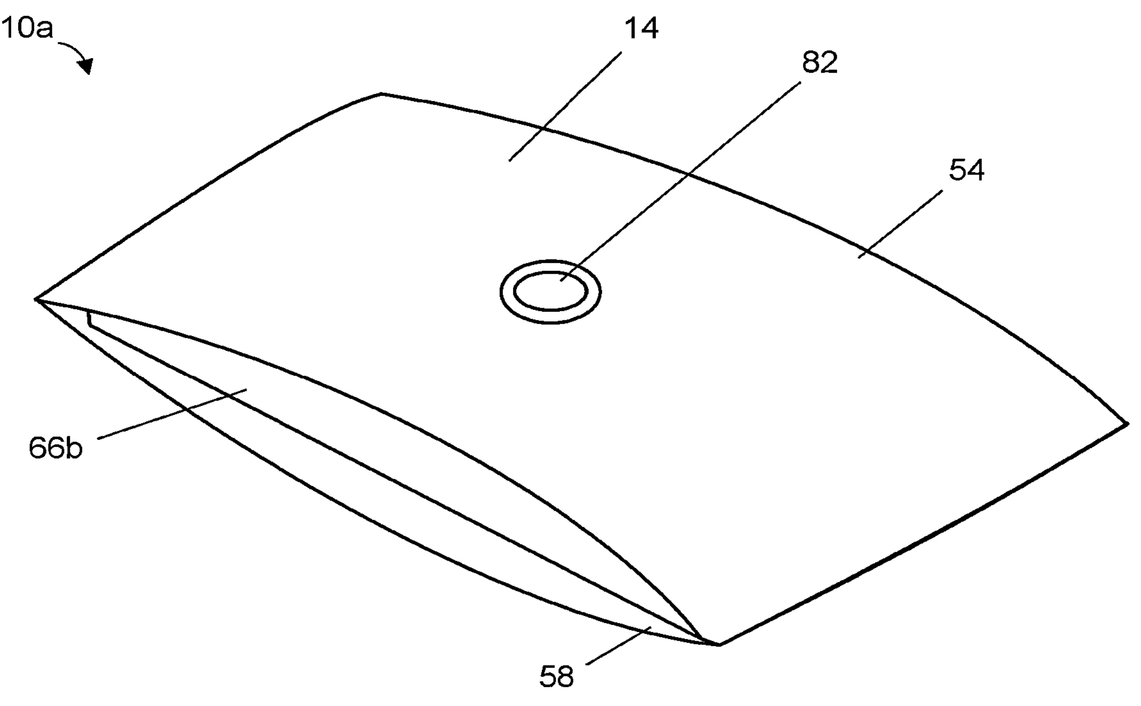
FIG. 2 is an upper perspective view of a second embodiment of the present ice packs comprising a port for receiving liquid.

FIG. 2 is an upper perspective view of an embodiment 10*a* of the present ice packs. Ice pack 10*a* is substantially similar to ice pack 10 with one primary difference; namely, that ice pack 10*a* comprises a port 82 coupled to body 14 and configured to permit the liquid to be introduced into interior chamber 18. Port 82 can be threaded to receive a cap after the liquid has been introduced into interior chamber 18, or can include a one-way valve, for example a flapper valve or a self-sealing membrane that is configured to automatically close the opening after liquid is received in the interior chamber. In this embodiment, because the opening is defined by and through only one of first and second layers 54, 58, side panels 66*a* and 66*b*, the first layer, and/or the second layer can be bonded to one another around the entire perimeter of interior chamber 18 during manufacture such that closing the interior chamber does not require folding or otherwise bonding the first and second layers to each other.

Figure 3:
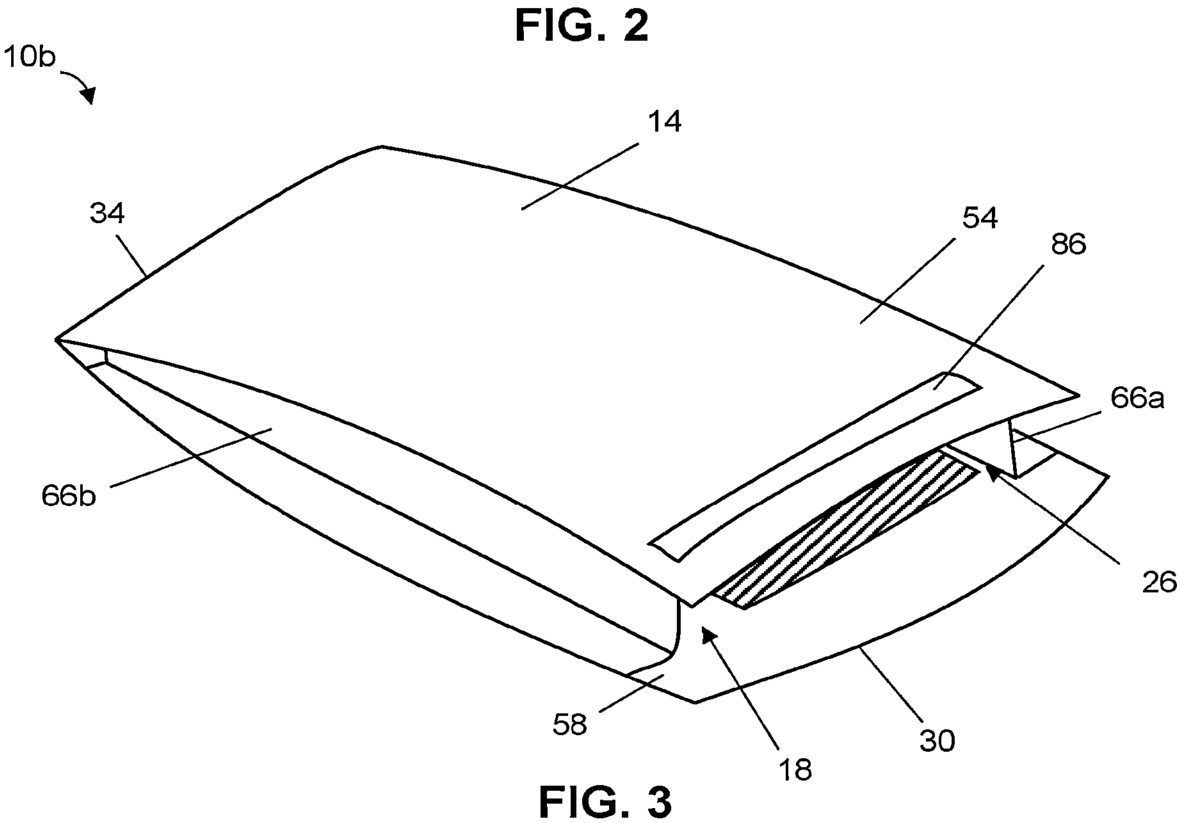
FIG. 3 is an upper perspective view of a third embodiment of the present ice packs comprising an adhesive region for closing the ice pack after liquid is received therein.

FIG. 3 is a perspective view of another embodiment 10*b* of the present ice packs. Ice pack 10*b* is substantially similar to ice pack 10 with one primary difference; namely, that ice pack 10*b* comprises an adhesive region 86 for closing the ice pack after liquid is added to its interior chamber 18. More specifically, portions of first and second layers 54, 58 at top end 30 can be folded over, for example two or more times, and pressed or otherwise adhered to adhesive region 86 to retain the folded portions in the folded configuration, thereby closing interior chamber 18. As shown, adhesive region 86 comprises a pressure-sensitive adhesive disposed on and spanning a majority, for example all, of the width of an exterior surface of first layer 54; but may, in other embodiments, be disposed on an exterior surface of second layer 58. During manufacture and/or shipping of ice pack 10*b*, adhesive region 86 may be covered by a liner to prevent contamination of the adhesive. In this embodiment, adhesive region 86 is disposed closer to top end 30 than to bottom end 34.

Figure 4:
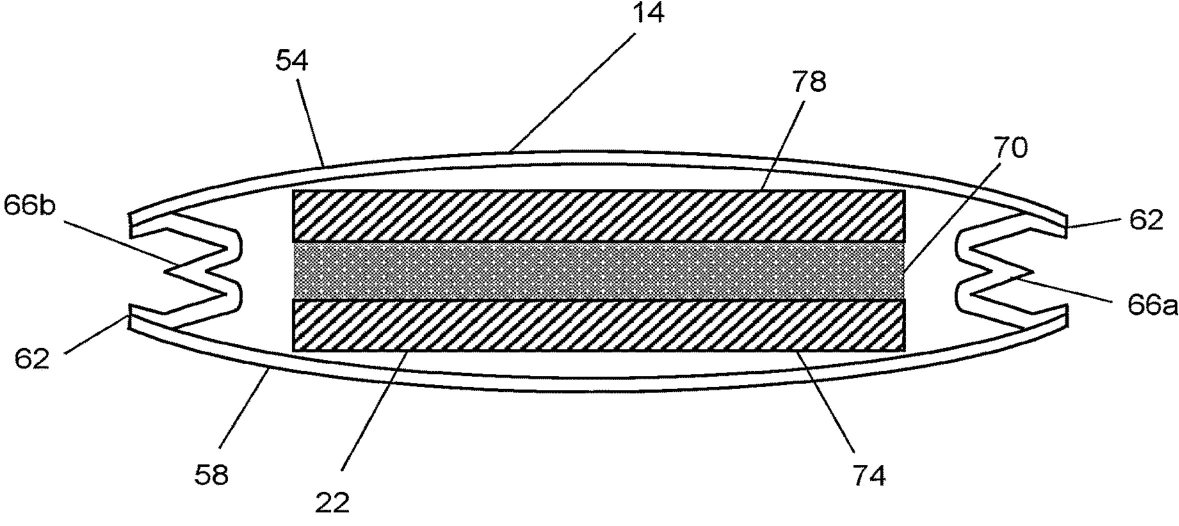
FIG. 4 is a cross-sectional view of a fourth embodiment of the present ice packs, in a partially expanded state, comprising side panels configured to have multiple folds for increasing the expandability of the ice pack.

FIG. 4 is a cross-sectional view of another embodiment 10*c* of the present ice packs. Ice pack 10*c* is substantially similar to ice pack 10 with one primary difference; namely that side panels 66*a* and 66*b* of ice pack 10*c* are configured such that, when body 14 is in a collapsed and/or partially expanded state and the side panels extend inwardly toward a center of the body, each of the side panels has multiple folds. For example, each of side panels 66*a* and 66*b* can have two or more folded segments; as shown, each of the side panels has four folded segments to form a "Z" fold. Side panels configured to have more folds can increase the expandable volume of, and thus the amount of liquid receivable in, some of the present ice packs.

Figure 5:
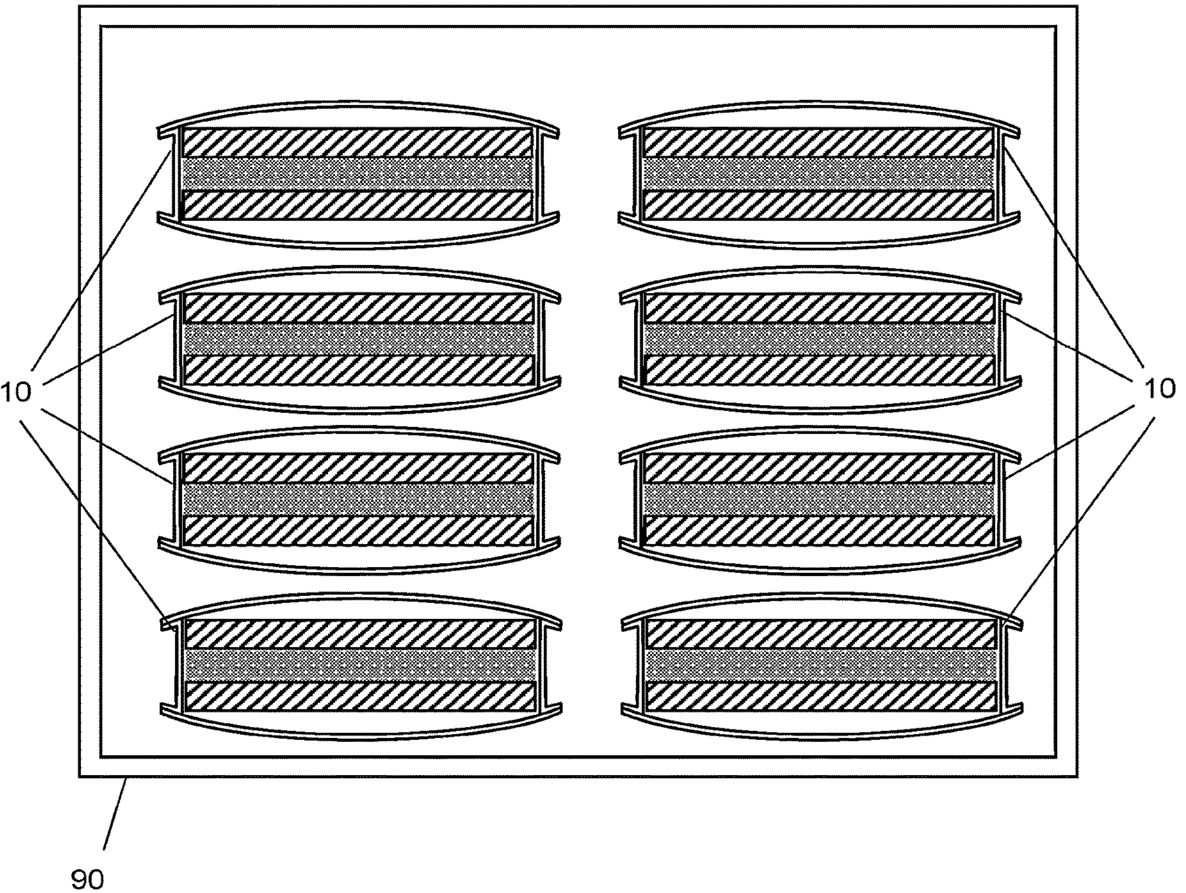
FIG. 5 is a top view of a container in which a plurality of the ice packs of FIG. 1A are disposed.

FIG. 5 is a top view of a container 90, for example a cardboard box, in which a plurality of ice packs 10 are disposed. In the embodiment shown, ice packs 10 are in a substantially dry state—i.e., liquid has not yet been deliberately introduced into their interior chambers. Ice packs 10 are shown in an expanded state in container 90; however, each of the ice packs can be in a collapsed or partially expanded state when in the container. As noted above, the ability to ship the present ice packs in a dry state allows them to be shipped for significantly less expense than prior art ice packs that are shipped in a wet or hydrated state, at least because the water or other liquid in such prior art ice packs adds significant weight and/or bulk. As such, a container 90 of the present ice packs can be shipped from a first location at which the ice packs are manufactured or packaged for distribution to a second location, such as a cold storage warehouse where the ice packs can be hydrated and frozen. Such hydrated and frozen ice packs can then be disposed in other containers, for example similar to container 90, with one or more perishable items, such as food, or otherwise temperature-sensitive items, such as pharmaceuticals or biological samples, such that the frozen ice pack(s) can keep the temperature of such items lower than it would be in the absence of the ice pack(s).

Figure 6:
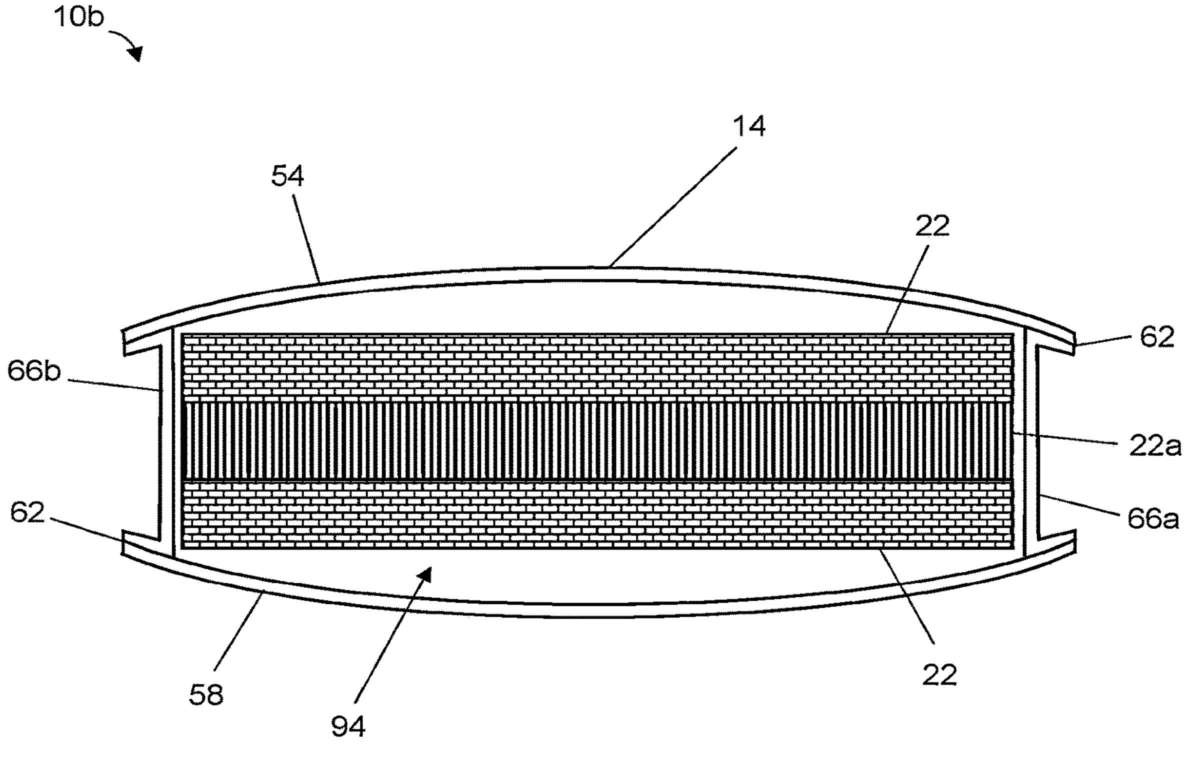
FIG. 6 is a cross-sectional view of another embodiment of the present ice packs in an expanded state.
Figure 7:
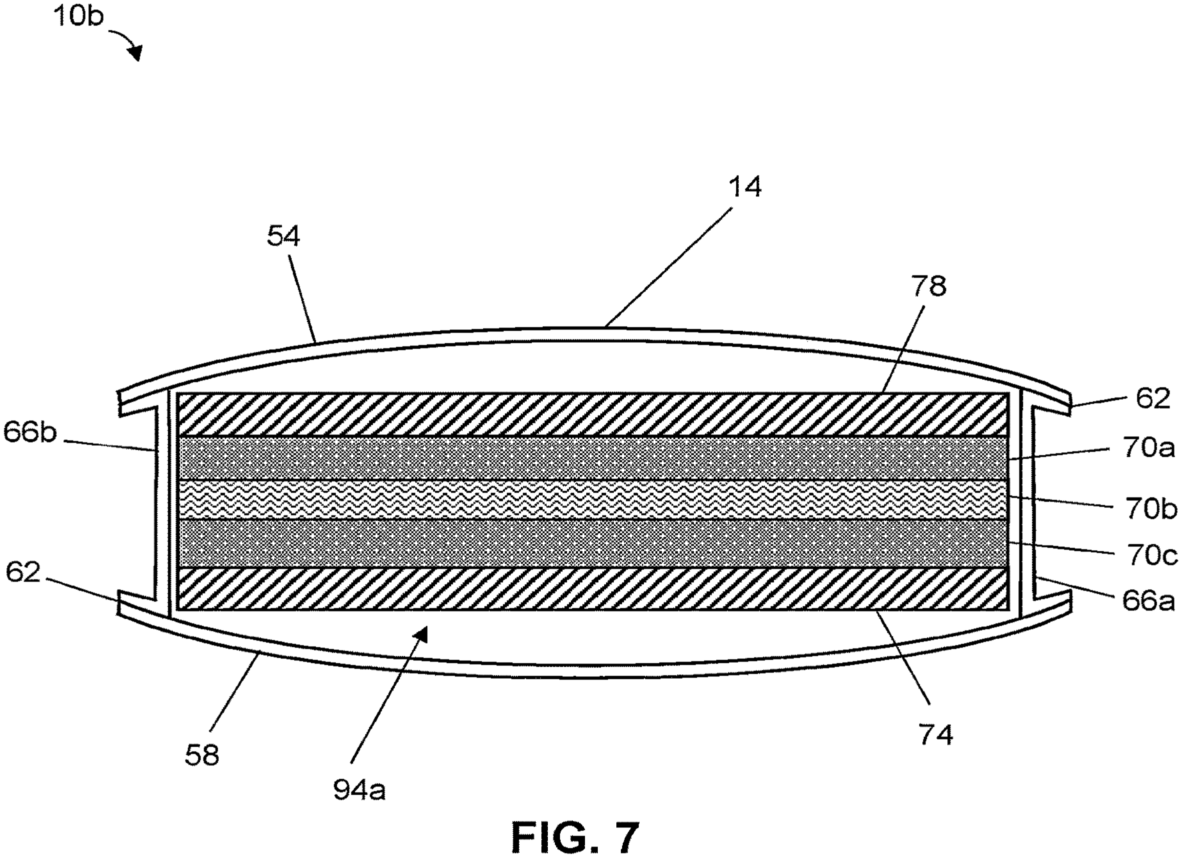
FIG. 7 is a cross-sectional view of another embodiment of the present ice packs in an expanded state.

Referring to FIGS. 6 and 7, additional embodiments of absorbent cores of ice packs are illustrated. FIGS. 6 and 7 each illustrate an embodiment of an ice pack having an absorbent core which includes a non-SAP layer positioned (e.g., sandwiched) between two SAP layers. FIG. 6 illustrates an embodiment where the absorbent core includes a non-SAP absorbent material (e.g., laminate) positioned between two SAP absorbent materials (e.g., laminate), and FIG. 7 illustrates an embodiment where the two SAP layers are inner layers.

Referring to FIG. 6, another embodiment of an ice pack **10*b* is illustrated. As compared to ice pack 10 and ice pack 10*a*, ice pack 10*b* includes an absorbent core 94 comprising multiple layers of absorbent material 22, 22*a*. As illustrated in FIG. 6, absorbent core 94 includes a first absorbent material 22, a second absorbent material 22*a*, and a third absorbent material 22. First and third absorbent materials 22 may include or correspond to a first type of absorbent material or absorbent laminate, such as the absorbent material 22 described above. First and third absorbent materials 22 may include or correspond to a SAP absorbent material (e.g., SAP absorbent laminate). Absorbent material 22*a* includes absorbent paper, fibers, or polymers, and does not include SAP; Absorbent material 22*a* includes or corresponds to a non-SAP absorbent material (e.g., non-SAP absorbent laminate). Absorbent material 22*a* may similarly comprise multiple layers, such as multiple layers of tissue, a carded nonwoven, or both, as described further herein with reference to FIG. 8**.

In some implementations, absorbent material **22*a* may include or correspond to a laminate that comprises two layers, i.e., a first layer and a second layer (e.g., two "outer" layers, such as 74, 78). In other implementation, absorbent material 22*a* may include or correspond to a laminate that comprises one or more inner layers positioned between a first outer layer (e.g., 74) and a second outer layer (e.g., 78). In a particular implementation, absorbent material 22*a* includes one or more inner layers positioned between the first and second outer layers that comprise an absorbent paper, fabric, or polymer, and that do not comprise SAP material, i.e., is manufactured independent of SAP material. Similar to ice pack 10 and 10*a* above, the first outer layer (e.g., 74), the one or more inner layers, and the second outer layer (e.g., 78**) may comprise at least one of a tissue and a carded nonwoven.

In some implementations, one or more of absorbent materials 22, **22*a* of absorbent core 94 may itself be a laminate of one or more layers of paper. In a particular implementation, each of absorbent material 22, 22*a* is a laminate of one or more layers. Accordingly, in such implementations absorbent core 94** may comprise a composite laminate of smaller or intermediate laminates.

The laminate can form a structure that is similar in some respects, and can be manufactured by known methods used for, absorbent cores used in disposable diapers, incontinence pads, and other disposable absorbent articles. By way of illustration, absorbent material **22*a*** can be formed by laying a mixture of absorbent material and adhesive—which becomes a first layer—on a second inner layer.

In use of the embodiment shown (i.e., during operation), liquid is introduced into interior chamber 18 and at least some, and in some instances substantially all, of the liquid is absorbed by absorbent core 94. To illustrate, some of the liquid is absorbed by absorbent material 22 and some of the liquid is absorbed by absorbent material **22*a*. Absorbent material 22 may act as walls for absorbent material 22*a*, which may function as a reservoir for a substantial or majority portion of the liquid. Increasing a size or a number of layers of absorbent material 22*a* increases the fluid capacity of the ice pack 10*b*. Body 14 can be collapsed, partially expanded, or fully expanded prior to introduction of the liquid, and liquid can be introduced until the body is partially or fully expanded. The temperature of the ice pack can then be lowered, for example in a freezer, to freeze the liquid. Prior to or after freezing the liquid, opening 26 can be closed to fully enclose absorbent core 94 and the liquid in interior chamber 18. For example, top end 30 of layers 54, 58 can be folded over one or more times toward, and taped, stapled, or otherwise fixed relative to, front side 46 or back side 50 of body 14. In other embodiments, layers 54 and 58 can be taped or glued together at top end 30** without folding.

Referring to FIG. 7, another embodiment of an ice pack **10*b* is illustrated. As compared to ice pack 10 and ice pack 10*a*, ice pack 10*b* of FIG. 7 includes absorbent core 94*a*. Absorbent core 94*a* comprises multiple inner layers, 70*a*-70*c***, such as multiple different types of inner layers.

In some implementation, absorbent core **94*a* may include or correspond to a laminate that comprises inner layers 70*a*-70*c* positioned between first outer layer 74 and second outer layer 78. In a particular implementation, one or more inner layers of inner layers 70*a*-70*c***, such as multiple different types of inner layers.

In some implementation, absorbent core **94*a* may include or correspond to a laminate that comprises inner layers 70*a*-70*c* positioned between first outer layer 74 and second outer layer 78. In a particular implementation, one or more inner layers or inner layers 70*a*-70*c* comprise super absorbent polymer (SAP) material and one or more other inner layers of inner layers 70*a*-70*c* do not comprise SAP material, i.e., is manufactured independent of SAP material. As illustrated in FIG. 7, first inner layer 70*a* and third inner layer 70*c* include SAP material and second inner layer 70*b* does not include SAP material. Similar to ice pack 10 and 10*a* above, first outer layer 74 can comprise at least one of a tissue and a carded nonwoven, and second outer layer 78** can comprise at least one of a tissue and a carded nonwoven.

While absorbent core **94*a*, as shown, has three inner layers 70*a*-70*c* positioned or disposed between a first outer layer 74 comprising at least one of a tissue and a carded nonwoven and a second outer layer 78 comprising at least one of a tissue and a carded nonwoven, in other embodiments the absorbent core 94*a* can have two inner layers or more than three inner layers. Absorbent core 94*a* may comprise, for example, 2, 3, 4, 5, 6, 7, 8, or more inner layers (e.g., 70*a*-70*c*). Additionally, or alternatively, while absorbent core 94*a* includes two outer layers 74, 78 (e.g., substrate layers) in the example of FIG. 7, in other implementations absorbent core 94*a* includes additional substrate layers (e.g., 74 and/or 78). Inner layers (e.g., SAP and non-SAP inner layers) and substrate layers can be layered in any suitable fashion. By way of illustration, and without limitation, absorbent core 94*a*** can comprise one or more inner substrate layers, disposed between first and second outer substrate layers. In some of such embodiments, the inner substrate layer or layers can be disposed between the SAP layers.

While absorbent core 94*a*, as shown, has a single inner layer (e.g., 70*b*) not including SAP disposed between two inner layers (e.g., 70*a* and 70*c*) comprising SAP, in other embodiments absorbent core 94*a* can have additional or fewer SAP inner layers and/or additional non-SAP inner layers. Absorbent core 94*a* can comprise, for example, 1, 2, 3, 4, 5, 6, 7, 8, or more SAP inner layers (e.g., 70*a* or 70*c*) and 1, 2, 3, 4, 5, 6, 7, 8, or more non-SAP inner layers (e.g., 70*b*), or any combination thereof. In a particular implementation, absorbent core 94*a* has multiple non-SAP inners layers (e.g., multiple layers of 70*b*) disposed between two SAP inner layers (e.g., 70*a* and 70*c*).

In some implementations, one or more inner layers of inner layers 70*a*-70*c* may itself be a laminate of one or more layers of paper. In a particular implementation, each inner layer 70*a*-70*c* is a laminate of one or more layers. Accordingly, in such implementations absorbent core 94*a* may comprise a composite laminate of smaller or intermediate laminates.

The laminate can form a structure that is similar in some respects, and can be manufactured by known methods used for, absorbent cores used in disposable diapers, incontinence pads, and other disposable absorbent articles. By way of illustration, absorbent core 94*a* can be formed by laying a mixture of SAP and adhesive—which becomes first inner layer 70*a*—on a first side of second inner layer 70*b*, and thereafter laying a second mixture of SAP and adhesive—which becomes third inner layer 70*a* on a second (opposite) side of second inner layer 70*b*. The interior (e.g., 70*a*-70*c*) of absorbent core 94*a* may then be adhered to outer layers 74 and 78 by adhesive.

In use of the embodiment shown (i.e., during operation), liquid is introduced into interior chamber 18 and at least some, and in some instances substantially all, of the liquid is absorbed by absorbent core 94*a*. Body 14 can be collapsed, partially expanded, or fully expanded prior to introduction of the liquid, and liquid can be introduced until the body is partially or fully expanded. The temperature of the ice pack can then be lowered, for example in a freezer, to freeze the liquid. Prior to or after freezing the liquid, opening 26 can be closed to fully enclose absorbent material 22 and the liquid in interior chamber 18. For example, top end 30 of layers 54, 58 can be folded over one or more times toward, and taped, stapled, or otherwise fixed relative to, front side 46 or back side 50 of body 14. In other embodiments, layers 54 and 58 can be taped or glued together at top end 30 without folding.

Not to be bound by any particular theory, a laminate comprising an arrangement of layers such that one or more layers of non-SAP material is positioned between two layers of SAP material, as in FIGS. 6 and 7, may better absorb and/or retain liquids received in between the two layers of SAP material, such as interior chamber 18, than other absorbent materials and arrangements of absorbent materials. As an illustrative, non-limiting example, the one or more layers of non-SAP material may function as a reservoir to hold the liquid (e.g., water), and the SAP layers on the exterior may function to provide a more robust exterior or "dryness" layer to increase integrity of the laminate. Such improved liquid absorption, retention, and/or integrity may enable interior chamber 18 to receive relatively larger volumes of liquid—as permitted by the expandability of body 14—without material degradation of the laminate and paper thereof. In other implementations, the pattern or arrangement of layers, absorbent materials, and/or laminates described with reference to FIGS. 6 and/or 7 may be repeated to form an absorbent core that includes multiple reservoirs (e.g., multiple sections or layers of non-SAP material bounded by at least one SAP material).

Figure 8:
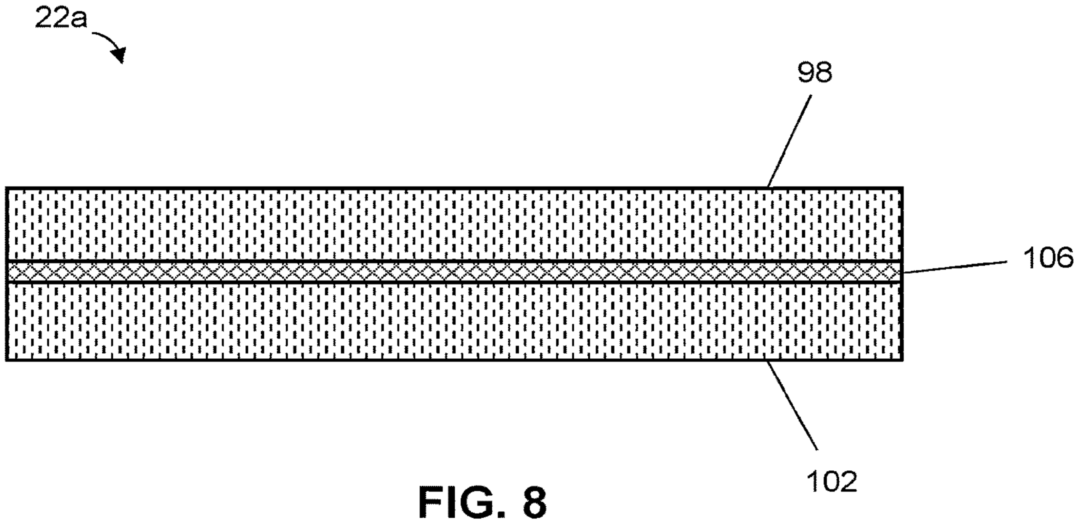
FIG. 8 is a cross-sectional view of an embodiment of the absorbent material of the ice pack of FIG. 6 in an expanded state.

Referring to FIG. 8, an embodiment of absorbent material 22*a* is illustrated. As illustrated in FIG. 8, absorbent material 22*a* include two layers 98 and 102. Layers 98 and 102 each include tissue or tissue and a carded nonwoven. Layers 98 and 102 include absorbent paper, fibers, or polymers and do not include SAP.

Layers 98 and 102 are adhered together by adhesive 106, such as an adhesive layer as illustrated in FIG. 8. In other implementations, adhesive 106 is mixed with one or more layers of absorbent material 22*a* to adhere multiple layers of absorbent material 22*a* together, such as to form a laminate. Although two layers, 98 and 102, are illustrated in FIG. 8, in other implementations absorbent material 22*a* includes additional layers.

In some of the above implementations, body 14 (e.g., one or more of first layer 54, second layer 58, or side panels 66*a* and 66*b*) includes wet strength resin. In other implementations, body 14 (e.g., one or more of first layer 54, second layer 58, or side panels 66*a* and 66*b*) does not include wet strength resin, e.g., is not manufactured with resin configured to increase a wet strength of the body 14, such as how well body 14 can resist rupture when body 14 is wet. In some implementations, body 14 (e.g., one or more of first layer 54, second layer 58, or side panels 66*a* and 66*b*) has a basis weight greater than any one, or between any two, of: 20, 30, 40, 50, 60, 70, 80, 90, 100, 110, 120, 130, 140, 150, or more gsm. In a particular implementation, body 14 has a basis weight of 120 gsm. To illustrate, body 14 on average has a basis weight of 120 gsm or one or more components of body 14 has a basis weight of 120 gsm.

In some of the above implementations, body 14 is water repellent. For example, at lower basis weights, such as 30 gsm, body 14 repelling water increases the structural integrity of the ice pack 10*b*. To illustrate, body 14 may reduce or prevent liquid within interior chamber 18 from leaving. In some implementations, the SAP of ice pack 10*b* has a lower basis weight as compared to the ice packs 10 or 10*a*.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method of manufacturing an ice pack comprising dispensing liquid into an opening on a body, wherein said body comprises
paper, wherein said paper is configured to resist degradation when exposed to water, wherein:
the body defines an interior chamber and said opening, wherein said opening is in communication with the interior chamber, the opening configured to receive liquid into the interior chamber and to be closed after the liquid is received therein; and
the body comprises a first layer of said paper having a first perimeter,
a second layer of said paper having a second perimeter,
one or more side panels,
each side panel of the one or more side panels coupled to the first and second layers such that the body is expandable from a collapsed state to an expanded state, in which:
at least a portion the first perimeter and at least a portion of the second perimeter are disposed farther apart in the expanded state than when the body is in the collapsed state;
each side panel of the one or more side panels extends from the first layer to the second layer; and
a volume of the interior chamber is larger in the expanded state than when the body is in the collapsed state; and
an absorbent material disposed in the interior chamber such that, when said liquid is received into the interior chamber from the opening, the absorbent material absorbs at least some of said liquid; and
closing said opening.

2. The method of claim 1, wherein the absorbent material comprises a laminate having an inner layer disposed between first and second outer layers, wherein the inner layer comprises superabsorbent polymer (SAP), the first outer layer comprises tissue, and the second outer layer comprises at least one of tissue and a carded nonwoven.

3. The method of claim 2, wherein the SAP has a centrifuge retention capacity between 30 and 50 grams per gram (g/g).

4. The method of claim 2, wherein the SAP has a centrifuge retention capacity between 32 and 37 grams per gram (g/g) or between 44 and 48 g/g.

5. The method of claim 1, wherein the body further comprises an absorbent core disposed in the interior chamber, the absorbent core including the absorbent material and a second absorbent material, the second absorbent material different from the absorbent material.

6. The method of claim 5, wherein the absorbent core further comprises a third absorbent material, wherein the absorbent material and the third absorbent material comprise superabsorbent polymer (SAP), and wherein the second absorbent material does not comprise SAP.

7. The method of claim 5, wherein the absorbent core comprises a laminate.

8. The method of claim 1, wherein the absorbent material comprises a laminate having an inner layer disposed between first and second outer layers, wherein the first and second outer layers comprise superabsorbent polymer (SAP), and wherein the inner layer does not comprise SAP.

9. The method of claim 1, wherein each side panel of the one or more side panels is bonded to a first portion of each of the first and second perimeters.

10. The method of claim 9, wherein the first layer of paper is bonded to the second layer of paper along a second portion of each of the first and second perimeters.

11. The method of claim 9, wherein:
the opening is defined by a third portion of each the first and second perimeters; and
for each of the first and second perimeters, the first portion and the second portion comprise a majority of the corresponding perimeter.

12. The method of claim 9, wherein each side panel of the one or more side panels is foldable such that, when the body is in the collapsed state, at least a portion of the side panel extends farther inwardly towards a center of the body than when the body is in the expanded state.

13. The method of claim 1, wherein said opening is defined by and through one of the first and second layers of paper.

14. The method of claim 1, wherein said paper has a wet tensile strength of 20% or more of the paper dry tensile strength.

15. The method of claim 1, wherein said paper has a basis weight of between 20 to 150 gsm.

16. The method of claim 1, wherein said paper is configured to be liquid impermeable for a period greater than 5 minutes.

17. The method of claim 1, further comprising
freezing said liquid.

18. The method of claim 17, wherein the one or more side panels comprise two or more side panels wherein the liquid is disposed in the absorbent material, and the liquid is frozen.

19. The method of claim 1, wherein said closing said opening further comprises
folding a portion of said first layer and an adjacent portion of second layer over said opening.

20. The method of claim 1, wherein said closing said opening further comprises
affixing an adjacent portion of said first layer and an adjacent portion of second layer to each other.

21. The method of claim 1, wherein said opening comprises a port coupled to said body, and said closing said opening comprises one or more of closing a one-way valve, a self-sealing membrane or a cap disposed over said port.

* * * * *